United States Patent
Wang et al.

(10) Patent No.: US 9,312,571 B2
(45) Date of Patent: Apr. 12, 2016

(54) TRACTION BATTERY THERMAL PLATE WITH FLEXIBLE BLADDER

(71) Applicant: Ford Global Technologies, LLC, Dearborn, MI (US)

(72) Inventors: Yongcai Wang, Troy, MI (US); Patrick Daniel Maguire, Ann Arbor, MI (US); Brian Utley, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 14/219,324

(22) Filed: Mar. 19, 2014

(65) Prior Publication Data

US 2015/0270586 A1 Sep. 24, 2015

(51) Int. Cl.
*H01M 10/6556* (2014.01)
*H01M 10/625* (2014.01)
*H01M 10/42* (2006.01)

(52) U.S. Cl.
CPC ...... *H01M 10/4207* (2013.01); *H01M 10/5016* (2013.01); *H01M 10/5057* (2013.01); *H01M 2220/20* (2013.01)

(58) Field of Classification Search
CPC ............ H01M 10/50; H01M 10/5004; H01M 10/5006; H01M 10/5016; H01M 10/5032; H01M 10/504; H01M 10/5044; H01M 10/5053; H01M 10/5075
See application file for complete search history.

(56) References Cited

U.S. PATENT DOCUMENTS

| | | | |
|---|---|---|---|
| 4,498,530 A | | 2/1985 | Lipschutz |
| 5,786,980 A | * | 7/1998 | Evans ........................... 361/502 |
| 6,301,097 B1 | | 10/2001 | Ellsworth, Jr. et al. |
| 2004/0067414 A1 | * | 4/2004 | Wei et al. ....................... 429/166 |
| 2005/0011692 A1 | * | 1/2005 | Takahashi et al. ............ 180/68.5 |
| 2005/0089750 A1 | * | 4/2005 | Ng et al. ........................ 429/120 |
| 2005/0241799 A1 | | 11/2005 | Malone et al. |
| 2007/0091570 A1 | | 4/2007 | Campbell et al. |
| 2009/0159241 A1 | | 6/2009 | Lipp et al. |
| 2013/0004822 A1 | * | 1/2013 | Hashimoto et al. ........... 429/120 |
| 2014/0242476 A1 | * | 8/2014 | Kuhne et al. .................. 429/407 |

FOREIGN PATENT DOCUMENTS

JP 07073908 A * 3/1995 ............ H01M 10/50
JP 2012114030 A * 6/2012

* cited by examiner

*Primary Examiner* — Carlos Barcena
(74) *Attorney, Agent, or Firm* — David B. Kelley; Brooks Kushman P.C.

(57) ABSTRACT

A traction battery thermal plate assembly may include a structure having edge portions defining a cavity and configured to support a battery cell array. A flexible bladder may be disposed within the cavity between the structure and array. The flexible bladder may be configured to be filled with a fluid such that the bladder contacts the array to transfer heat between the array and fluid. The assembly may include a frame sized to receive the flexible bladder and configured to support the flexible bladder. An inlet port may be in fluid communication with the flexible bladder and a pump, and may be configured to deliver fluid to the flexible bladder at a pump output rate. The flexible bladder may include ribs defining channels therebetween. The channels may be configured to direct fluid flow along the at least one surface of the battery cell array.

17 Claims, 5 Drawing Sheets

TRACTION BATTERY THERMAL PLATE WITH FLEXIBLE BLADDER

TECHNICAL FIELD

This disclosure relates to thermal management systems for high voltage batteries utilized in vehicles.

BACKGROUND

Vehicles such as battery-electric vehicles (BEVs), plug-in hybrid-electric vehicles (PHEVs) or full hybrid-electric vehicles (FHEVs) contain a traction battery, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells.

SUMMARY

A traction battery thermal plate assembly includes a structure having edge portions defining a cavity and configured to support a battery cell array and a flexible bladder disposed within the cavity between the structure and array. The flexible bladder is configured to be filled with a fluid such that the bladder contacts the array to transfer heat between the array and fluid. The flexible bladder may be of a material with dielectric characteristics such that contents of the bladder are electrically insulated from the battery cells. A heat generating module may be packaged within a vicinity of the thermal plate and a portion of the flexible bladder may extend outside a footprint of the battery cell array and proximate to the heat generating module. The assembly may include a frame sized to receive the flexible bladder and configured to support the flexible bladder. An inlet port may be in fluid communication with the flexible bladder and a pump, and may be configured to deliver fluid to the flexible bladder at a pump output rate. A constrictor may be arranged between the inlet port and the flexible bladder, and configured to adjust a volumetric fluid flow rate of the fluid entering the flexible bladder. The flexible bladder may further be configured to direct thermal fluid flow along a bottom surface of the array.

A vehicle includes a battery cell array defining at least one surface, a support structure configured to support the array such that the array and support structure define a cavity therebetween, and a thermal plate configured for thermal communication with the array. The thermal plate extends throughout the cavity and along the surface of the battery cell array, and includes a flexible bladder configured to adjust between a first and second volume and defines a bladder surface configured to substantially conform to the surface of the battery cell array when the flexible bladder has the first or second volume. An inlet port may be in fluid communication with the flexible bladder and a pump configured to direct fluid flow thereto such that the flexible bladder expands or contracts between the first and second volumes. A heat generating module may be packaged within a vicinity of the thermal plate and a portion of the flexible bladder may extend outside a footprint of the battery cell array and proximate to the heat generating module. The flexible bladder may further include ribs defining channels therebetween and the channels may be configured to direct fluid flow along the at least one surface of the battery cell array. The ribs may also define the support structure such that the ribs receive a load of the array. The at least one surface may be a bottom surface of the array.

A traction battery assembly includes a battery cell array defining a bottom surface, a support structure configured to support the array such that the array and support structure define a cavity therebetween, and a thermal plate including a frame having ribs defining channels therebetween. The thermal plate is configured to direct thermal fluid flow therein and further includes a flexible bladder secured between portions of the frame and above the ribs defining a bladder cavity therebetween. The assembly also includes an inlet port configured to deliver thermal fluid to the bladder cavity. The flexible bladder is configured to expand in response to an increase in a pressure of the thermal fluid flow such that a surface of the flexible bladder contacts the bottom surface of the array. Another inlet port may be located on an end portion of the thermal plate opposite the other inlet port and configured to deliver thermal fluid to the bladder cavity. The inlet ports may be arranged to deliver fluid to separate channels in different flow directions relative to one another. The flexible bladder may be made of a material having dielectric properties. The flexible bladder may further be configured to direct fluid flow within the cavity along the bottom surface. A heat generating module may be packaged within a vicinity of the thermal plate and a portion of the flexible bladder may extend outside a footprint of the battery cell array and proximate to the heat generating module. A constrictor may be arranged between the inlet port and the bladder cavity and may be configured to adjust a volumetric fluid flow rate of the fluid entering the bladder cavity. The thermal plate may at least partially support the array.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
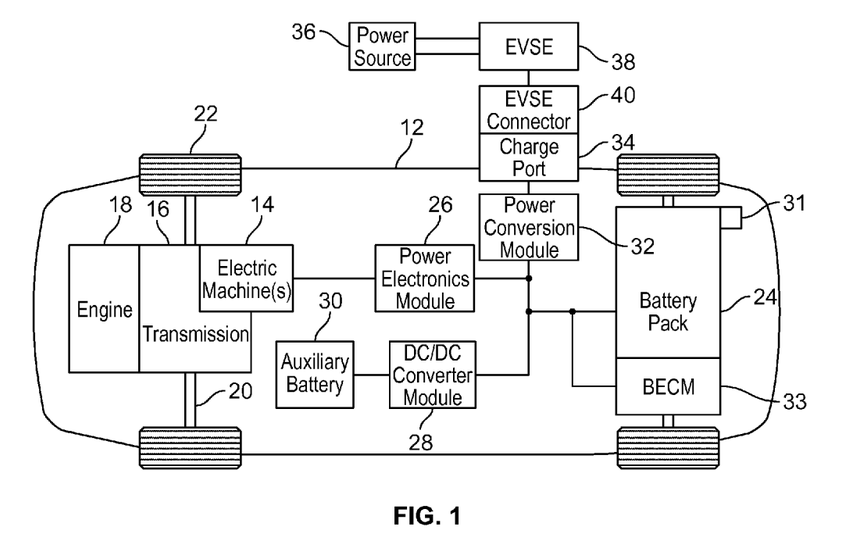
FIG. 1 is a schematic illustration of a battery electric vehicle.

FIG. 1 depicts a schematic of a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode under certain conditions.

A traction battery or battery pack 24 stores energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be, for example, an electric vehicle such as a plug-in hybrid vehicle, or a battery-electric vehicle in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

The traction battery 24 may be heated and/or cooled using a liquid thermal management system, an air thermal management system, or other method as known in the art. In one example of a liquid thermal management system and now referring to FIG. 2, the traction battery 24 may include a battery cell array 88 shown supported by a thermal plate 90 to be heated and/or cooled by a thermal management system. The battery cell array 88 may include a plurality of battery cells 92 positioned adjacent to one another. The DC/DC converter module 28 and/or BECM 33 may also require cooling and/or heating under certain operating conditions. A thermal plate 91 may support the DC/DC converter module 28 and BECM 33 and assist in thermal management thereof. For example, the DC/DC converter module 28 may generate heat during voltage conversion which may need to be dissipated. Alternatively, thermal plates 90 and 91 may be in fluid communication with one another to share a common fluid inlet port and common outlet port.

Figure 2:
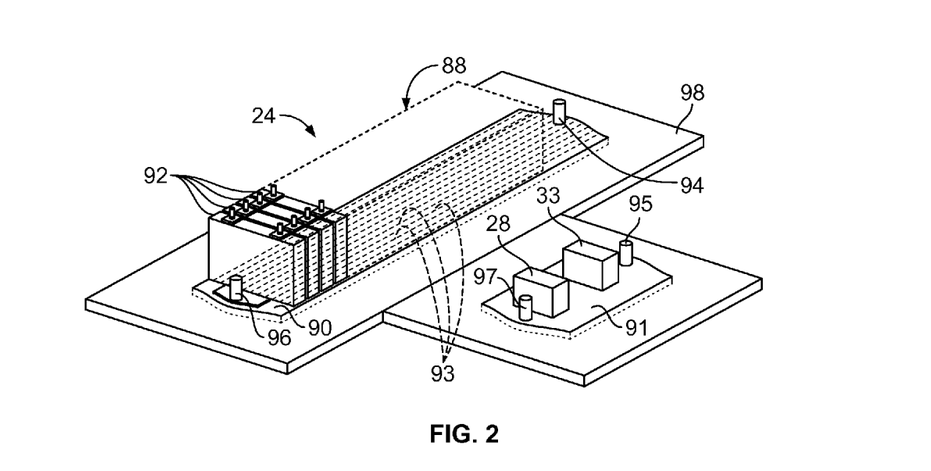
FIG. 2 is a perspective view of a portion of a thermal management system for the traction battery of the vehicle in FIG. 1.

In one example, the battery cell array 88 may be mounted to the thermal plate 90 such that only one surface, of each of the battery cells 92, such as a bottom surface, is in contact with the thermal plate 90. The thermal plate 90 and individual battery cells 92 may transfer heat between one another to assist in managing the thermal conditioning of the battery cell array 88 during vehicle operations. Uniform thermal fluid distribution and high heat transfer capability are two thermal plate 90 considerations for providing effective thermal management of the battery cell arrays 88 and other surrounding components. Since heat transfers between thermal plate 90 and thermal fluid via conduction and convection, the surface area in a thermal fluid flow field is important for effective heat transfer, both for removing heat and for preheating the battery cells 92 at cold temperatures. For example, charging and discharging the battery cells generates heat which may negatively impact performance and life of the battery cell array 88 if not removed. Alternatively, the thermal plate 90 may also provide heat to preheat the battery cell array 88 when subjected to cold temperatures.

The thermal plate 90 may include one or more channels 93 and/or a cavity to distribute thermal fluid through the thermal plate 90. For example, the thermal plate 90 may include an inlet port 94 and an outlet port 96 that may be in communication with the channels 93 for providing and circulating the thermal fluid. Positioning of the inlet port 94 and outlet port 96 relative to the battery cell arrays 88 may vary. For example and as shown in FIG. 2, the inlet port 94 and outlet port 96 may be centrally positioned relative to the battery cell arrays 88. The inlet port 94 and outlet port 96 may also be positioned to the side of the battery cell arrays 88. Alternatively, the thermal plate 90 may define a cavity (not shown) in communication with the inlet port 94 and outlet port 96 for providing and circulating the thermal fluid. The thermal plate 91 may include an inlet port 95 and an outlet port 97 to deliver and remove thermal fluid. Optionally, a sheet of thermal interface material (not shown) may be applied to the thermal plate 90 and/or 91 below the battery cell array 88 and/or the DC/DC converter module 28 and BECM 33, respectively. The sheet of thermal interface material may enhance heat transfer between the battery cell array 88 and the thermal plate 90. The thermal interface material may also provide electrical insulation between the battery cell array 88 and the thermal plate 90. A battery tray 98 may support the thermal plate 90, thermal plate 91, battery cell arrays 88, and other components. The battery tray 98 may include one or more recesses to receive thermal plates.

Different battery pack configurations may be available to address individual vehicle variables including packaging constraints and power requirements. The battery cell arrays 88 may be contained within a cover or housing (not shown) to protect and enclose the battery cell arrays 88 and other surrounding components, such as the DC/DC converter module 28 and the BECM 33. The battery cell arrays 88 may be positioned at several different locations including below a front seat, below a rear seat, or behind the rear seat of the vehicle, for example. However, it is contemplated the battery cell arrays 88 may be positioned at any suitable location in the vehicle 12.

Figure 3A:
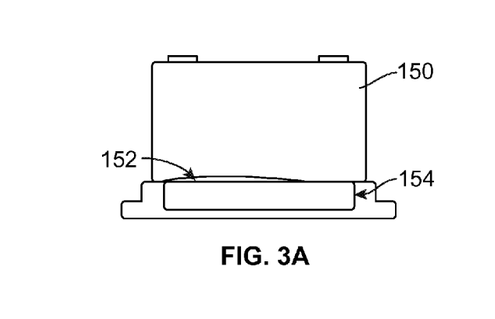
FIG. 3A is a front view of a battery cell array and a thermal plate showing a contact deficiency therebetween.
Figure 3B:
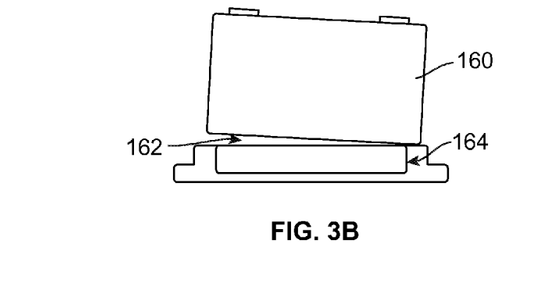
FIG. 3B is a front view of a battery cell array and a thermal plate showing a contact deficiency therebetween.
Figure 3C:
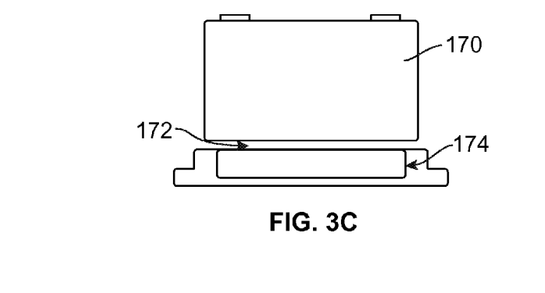
FIG. 3C is a front view of a battery cell array and a thermal plate showing a contact deficiency therebetween.

A contact of the mating surfaces between a thermal plate and surfaces of the battery cells is a factor which may affect heat transfer within a battery thermal management system, and particularly with regard to conduction between the thermal plate and the battery cells. The mating surfaces may be uneven due to surface tolerances, component irregularities, and/or debris which may result in gaps therebetween. Additionally, deformation of the battery cell array, such as bending and/or twisting, may result in battery cell to battery cell placement tolerances. For example, FIGS. 3A through 3C show three examples of mating surface contact deficiencies. In FIG. 3A, a battery cell 150 has an irregularity in a bottom portion of the battery cell 150 resulting in only partial contact, as shown by a gap 152, between the battery cell 150 and a thermal plate 154. This gap 152 may be due to, for example, a production variation which resulted in the irregular bottom portion of the battery cell 150. In FIG. 3B, a battery cell 160 is tilted resulting in partial contact and a gap 162 between the battery cell 160 and a thermal plate 164. This gap 162 may be due to, for example, movement of the battery cell 160 during operation and/or faulty installation of the battery cell 160. In FIG. 3C, a battery cell 170 is shown elevated resulting in no contact and a gap 172 between the battery cell 170 and a thermal plate 174. This gap 172 may also be due to production variation of the battery cell 170, faulty installation, and/or vibrations that occur during operation. Heat transfer relating to battery cell cooling may be less efficient where gaps are present between the mating surfaces of the respective thermal plates and bottom surfaces of the battery cells. Some thermal management systems may use a thermal interface layer to assist in filling gaps, however a thermal interface layer may not be able to compensate for certain contact deficiencies. Eliminating these contact deficiencies and/or obtaining a flush contact between the surfaces may be desirable to provide for more enhanced heat transfer within the thermal management system.

Figure 4:
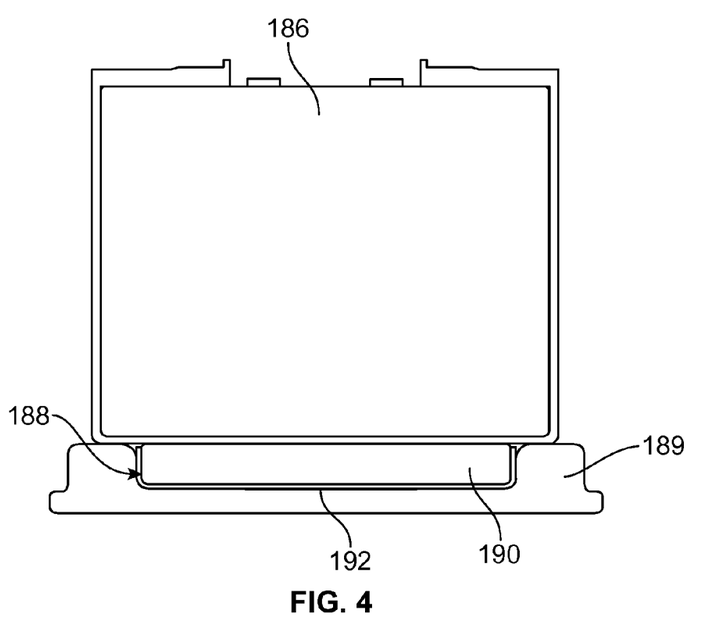
FIG. 4 is a front view of a battery cell array, a thermal plate with a flexible bladder, and a support structure.
Figure 5:
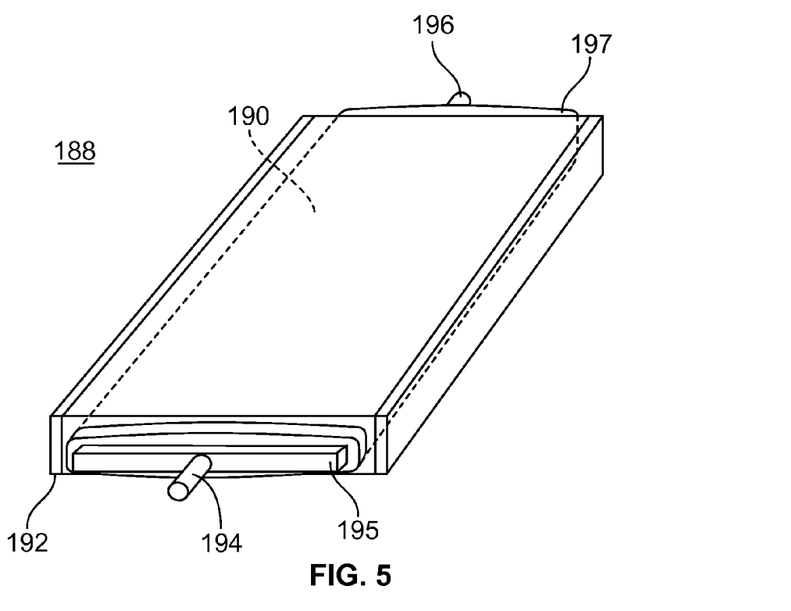
FIG. 5 is a perspective view of the thermal plate with a flexible bladder from FIG. 4.

FIGS. 4 and 5 show an example of a portion of a traction battery assembly which may include a battery cell array 186 in thermal communication with a thermal plate 188 for use with a thermal management system. The thermal plate 188 and battery cell array 186 may be supported by a support structure 189. The thermal plate 188 may be disposed within a cavity defined by edge portions of the support structure 189 and below the battery cell array 186. In this example, the thermal plate 188 may include a flexible bladder 190 which may be configured for thermal fluid flow therethrough. The flexible bladder 190 may operate as a membrane for the thermal fluid therein. The flexible bladder 190 may be housed within a pan 192 which may provide a frame to support the flexible bladder 190 and may also assist in preventing the flexible bladder 190 from being pierced by, for example, the support structure 189. The sizing of the thermal plate 188 may vary according to a desired heat transfer performance of the thermal management system. For example, FIGS. 4 and 5 show the thermal plate 188 extending along and below a bottom portion of the battery cell array 186. The thermal plate 188 may also extend to the outer edges of the battery cell array 186 or past the outer edges depending on a configuration of the support structure 189. The support structure 189 may be adapted to the corresponding size of the thermal plate 188 to assist in orienting and positioning the thermal plate 188 relative to the battery cell array 186.

Certain characteristics of a material used for the flexible bladder 190 and the pan 192 may assist in facilitating a thermal communication between the thermal plate 188 and the battery cell array 186. The flexible bladder 190 may be configured to expand or contract between a first volume and a second volume therein. The flexible bladder 190 may be made of a material which can expand and contract in response to thermal fluid pressure levels such that the flexible bladder 190 conforms to the bottom surface of the battery cell array 186, and thus may improve the mating contact between the battery cell array 186 and the thermal plate 188. The expansion of the flexible bladder 190 may be a function of the thermal fluid pressure. Higher pressures may sometimes be desirable for improved contact between the surfaces, however the higher pressures may result in volumetric flow rates which may be higher than desired. A constrictor (not shown), such as a nozzle or orifice, may be included to provide control options relative to the volumetric flow rate and as such, may assist in maintaining a constant and higher pressure along with the desired volumetric flow rate.

For example, the flexible bladder 190 may be made of a material with flexible and/or resilient characteristics such as a vulcanized rubber. Certain plastics may provide other examples of material, such as polyethylene. The improved mating contact may positively affect the performance of the battery cell array 186 and the life of battery cells therein. This improved mating contact may also eliminate the need for a thermal interface layer which may be used to fill air gaps and voids between battery cell arrays and thermal plates. The material of the flexible bladder 190 may also include dielectric properties to assist in insulating the battery cell array 186. Different shapes and sizes of the flexible bladder 190 may be available according to varying packaging constraints between different thermal management systems. Different suitable materials are available for the pan 192, such as certain kinds of plastic or metal, which may be more stiff and/or rigid than the material of the flexible bladder 190. Examples of suitable plastics may include polyethylene terephthalate, polyethylene, and polypropylene.

As mentioned above, the thermal management system may include the thermal plate 188 and be configured to circulate thermal fluid therethrough. A powered mechanism may operate to direct the thermal fluid flow and also to increase and/or decrease a pressure of the thermal fluid flow within the fluid system. One example of a powered mechanism includes a pump (not shown) in mechanical communication with a motor (not shown), though other examples are available. Inlet and outlet ports may assist in delivering and removing thermal fluid to and from the flexible bladder 190. Inlet plenums, outlet plenums, and manifolds may also be arranged with the ports and the flexible bladder 190 to assist in obtaining a desired fluid flow therein. For example, an inlet port 194 may be in fluid communication with the flexible bladder 190. An inlet plenum 195 may optionally be arranged between the inlet port 194 and the flexible bladder 190. While the inlet port 194 is shown in a central location of one of the side portions of the flexible bladder 190, it is contemplated that the inlet port 194 may be positioned in alternative locations and that there may be more than one inlet port 194. An outlet port 196 may be in fluid communication with the flexible bladder 190. An outlet plenum 197 may be arranged between the flexible bladder 190 and the outlet port 196. While the outlet port 196 is shown in a central location of another one of the side portions of the flexible bladder 190, it is contemplated the outlet port 196 may be positioned in alternative locations and that there may be more than one outlet port 196.

Figure 6A:
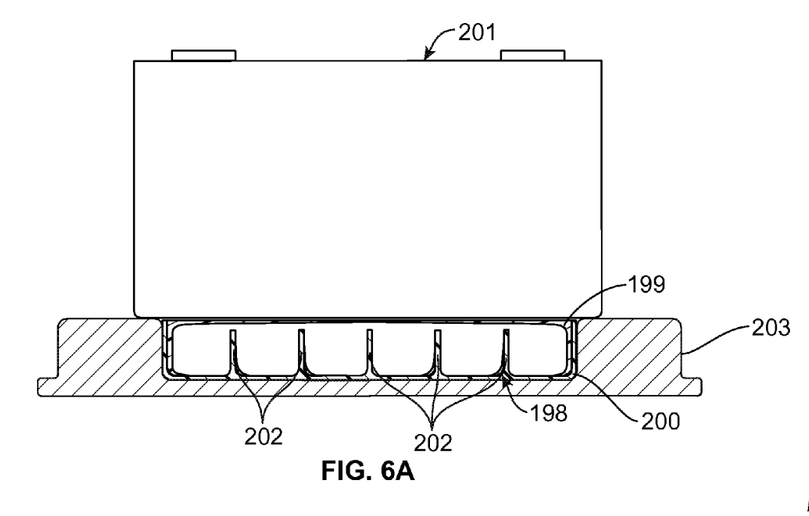
FIG. 6A is a front view, in cross-section, of a battery cell array, a thermal plate with a flexible bladder, and a support structure.
Figure 6B:
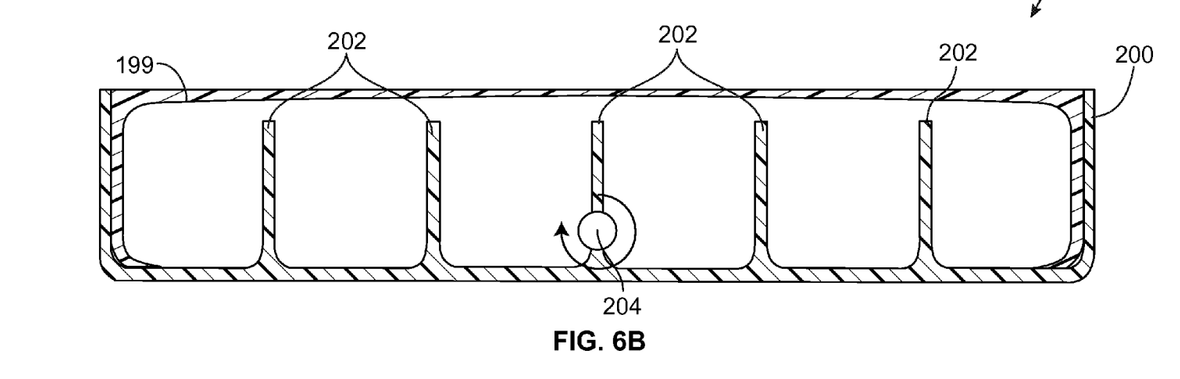
FIG. 6B is a front detailed view, in cross-section, of the thermal plate with a flexible bladder from FIG. 6A.
Figures 6C, 6D:
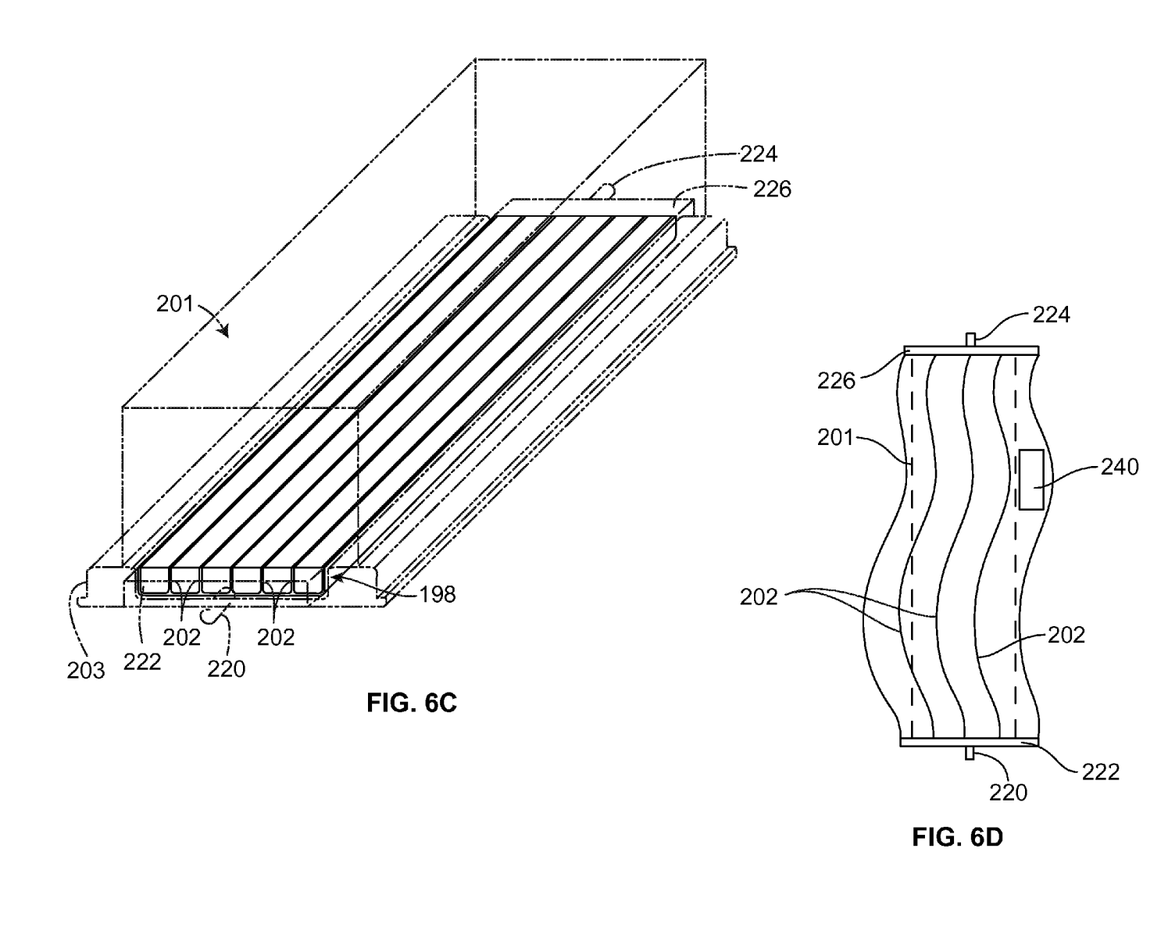
FIG. 6C is a perspective view of the battery cell array, the thermal plate with a flexible bladder, and the support structure from FIG. 6A.
FIG. 6D is a plan view of another thermal plate with a flexible bladder.

FIGS. 6A through 6C show another example of a traction battery assembly which may include a thermal plate 198 in thermal communication with a battery cell array 201 for use with a thermal management system. The thermal plate 198 and the battery cell array 201 may be supported by a support structure 203. The thermal plate 198 may include a flexible bladder 199. A pan 200 may operate as a frame for the flexible bladder 199 and define one or more ribs 202 which may define or partially define channels for fluid to flow therebetween and throughout the flexible bladder 199. In this example, the flexible bladder 199 may be considered a partial bladder as described further below. The pan 200 may be made of plastic and may define a bottom and a side portion of the thermal plate 198. It is contemplated that the ribs 202 may define different channel configurations according to a desired orientation relative to the battery cell array 186. For example, the channels may have a longitudinal orientation relative to the battery cell array 186 (as shown in FIGS. 6A through 6C) or may have a transverse orientation relative to the battery cell array 186 (not shown). In another example, the channels may follow a serpentine path. The different types of channel configurations may correspond to the type of battery cell included within the battery cell array 201 and/or may correspond to certain packaging constraints of the thermal management system. The surface area of the channels and/or internal portions of the flexible bladder 199 may also include surface enhancements and/or features to enhance heat transfer which may include turbulization and/or modifying a surface area within the channels and the flexible bladder 199. At least some of the surfaces of the channels and the flexible bladder 199 may include flow features configured to increase an effective surface area. For example, the flow features may include brazed split fins, brazed metal foam such as Aluminum, extrusions, dimples, or pedestals. These features may also assist in transferring more heat to a bottom portion of the thermal plate 198. In addition to providing additional surface area to assist with heat transfer, these measures may also adjust a velocity of thermal fluid flow.

The flexible bladder 199 may be made of a resilient, flexible, and/or expandable material, such as a thermoset plastic. Other examples of suitable material may include vulcanized rubber and certain plastics, such as polyethylene. A charge of the thermoset plastic may be spin molded about an axis 204 such that the flexible bladder 199 extends between the outer portions of pan 200. In one example of spin molding, the pan 200 may be positioned in a heated hollow mold which may be filled with a charge of material. The heat from the mold may soften the material. The mold may then be rotated about the axis 204 axis such that the softened material disperses and secures to the walls of the mold and the walls of the pan 200 to provide the flexible bladder 199. Varying the speed at which the mold is rotating and the location of the axis may provide for different variations in both the thickness of the material securing to the walls and/or the location on the walls where the materials secures thereto. In this example, the thermoset plastic may also operate as a dielectric barrier within the thermal plate 198 as mentioned above. The dielectric barrier may operate as an electrical insulator to maintain a degree of electrical isolation between the battery cell array 201, the individual battery cells, and the possibly conductive thermal fluid. The axis 204 may be tuned to provide different wall thickness for the flexible bladder 199. For example, positioning the axis 204 toward a lower portion of the thermal plate 198 may provide for the flexible bladder 199 to be thicker at the upper portion of the thermal plate 198 and thinner at the side portions of the thermal plate 198. The flexible bladder 199 may be secured to the side portions of the thermal plate 198 as shown in FIGS. 6A and 6B. It is also contemplated that the flexible bladder 199 may be secured to other locations within the thermal plate 198 with various adhesives. Another method of creating the thermal plate 198 with the flexible bladder 199 and ribs 202 may include injection molding, hot plate bonding, or laser welding. Each of these methods may also provide for connections between the flexible bladder 199 and the ribs 202. For example, connecting one or more portions of the flexible bladder 199 to the ribs 202 may prevent thermal fluid overflow between adjacent channels.

As mentioned above, the thermal management system may include the thermal plate 198 and be configured to circulate thermal fluid therethrough. The expansion of the flexible bladder 199 may be a function of the thermal fluid pressure. Higher pressures may sometimes be desirable for improved contact between the surfaces, however the higher pressures may result in volumetric flow rates which may be higher than desired. A constrictor (not shown), such as a nozzle or orifice, may be included to provide control options relative to the volumetric flow rate and as such, may assist in maintaining a constant and higher pressure along with the desired volumetric flow rate.

A powered mechanism may operate to direct the thermal fluid flow and also to increase and/or decrease a pressure of the thermal fluid flow within the system. One example of a powered mechanism includes a pump (not shown) in mechanical communication with a motor (not shown), though other examples are available. Inlet and outlet ports may assist in delivering and removing thermal fluid to and from the flexible bladder 199. Inlet plenums, outlet plenums, and manifolds may also be arranged with the ports and the flexible bladder 199 to assist in obtaining a desired fluid flow therein. For example, an inlet port 220 may be in fluid communication with the flexible bladder 199. An inlet plenum 222 may optionally be arranged between the inlet port 220 and the flexible bladder 199. While the inlet port 220 is shown in a central location of one of the side portions of the flexible bladder 199, it is contemplated that the inlet port 220 may be positioned in alternative locations and that there may be more than one inlet port 220. An outlet port 224 may be in fluid communication with the flexible bladder 199. An outlet plenum 226 may be arranged between the flexible bladder 199 and the outlet port 224. While the outlet port 224 is shown in a central location of another one of the side portions of the flexible bladder 199, it is contemplated the outlet port 224 may be positioned in alternative locations and that there may be more than one outlet port 224. The ports may be molded into the pan 200 or the flexible bladder 199.

Additional configurations of the flexible bladder 199 are available. For example, FIG. 6D shows the flexible bladder 199 in a configuration in which the channels defined by the ribs 202 may be considered wave-like. In this example, the channels may extend outside of a footprint of the battery cell array 201 and may provide cooling other components, such as a heat generating module 240. Examples of heat generating modules 240 may include a DCDC converter module and a BECM. It is contemplated that the flexible bladder 199 and channels therein may have other shapes according to packaging constraints and desired performance.

As shown in FIGS. 6A through 6C, the thermal plate 198 may be located in a cavity defined by edge portions of the support structure 203 and a bottom portion of the battery cell array 201. The flexible bladder 199 may be disposed within the cavity between the support structure 203 and the battery cell array 201. The flexible bladder 199 may be configured to be filled with a thermal fluid such that the flexible bladder 199 contacts the battery cell array 201 to transfer heat between the battery cell array 201 and the thermal fluid. In one example, a volume of the thermal plate 198 may be less than a volume of the cavity defined by the edge portions of the support structure 203 and the bottom portion of the battery cell array 201. As such, the support structure 203 may receive a load of the battery cell array 201 instead of the flexible bladder 199. Alternatively, the ribs 202 or other portions of the thermal plate 198 may support the battery cell array 201. Further and as described above, the flexible bladder 199 may expand to facilitate the desired contact with the battery cell array 201 once the battery cell array 201 is mounted to the support structure 203 and the flexible bladder 199 is filled with thermal fluid.

Figure 7A:
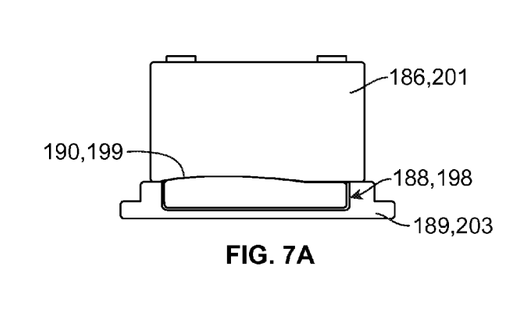
FIG. 7A is a front view of a battery cell array and a thermal plate showing a flexible bladder of the thermal plate compensating for a contact deficiency between the battery cell array and the thermal plate.
Figure 7B:
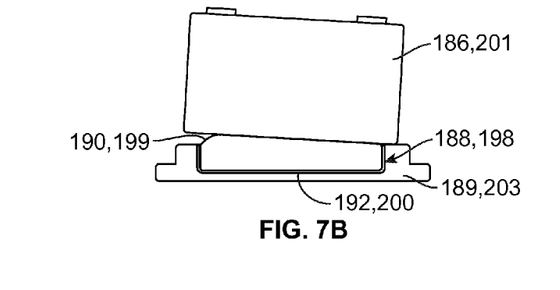
FIG. 7B is a front view of a battery cell array and a thermal plate showing a flexible bladder of the thermal plate compensating for a contact deficiency between the battery cell array and the thermal plate.
Figure 7C:
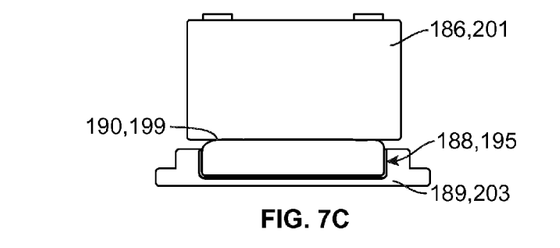
FIG. 7C is a front view of a battery cell array and a thermal plate showing a flexible bladder of the thermal plate compensating for a contact deficiency between the battery cell array and the thermal plate.

As such, the thermal plate 188 with a flexible bladder 190, and the thermal plate 198 with a flexible bladder 199, may assist in addressing the contact mating deficiencies described above. FIGS. 7A through 7C show examples of how the thermal plate 188 and thermal plate 198 may be used to address the mating deficiencies described in FIGS. 3A through 3C. In FIG. 7A, the flexible bladder 190 or flexible bladder 199 may expand to fill a gap similar to the gap 152 in FIG. 3A such that the mating surface of the flexible bladders 190 and 199 conform to the mating surface of the battery cell arrays 186 and 201, respectively. In FIG. 7B, the flexible bladders 190 and 199 may expand to fill a gap similar to the gap 162 in FIG. 3B such that the mating surface of the flexible bladders 190 and 199 conform to the mating surface of the battery cell arrays 186 and 201, respectively. In FIG. 7C, the flexible bladders 190 and 199 may expand to fill a gap similar to the gap 172 in FIG. 3C such that the mating surface of the flexible bladders 190 and 199 conform to the mating surface of the battery cell arrays 186 and 201 respectively.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery thermal plate assembly comprising:
   a structure having edge portions defining a cavity and configured to support an array of battery cells thereupon; and
   a flexible bladder disposed within the cavity between the structure and array, and configured to be filled with a fluid such that the bladder extends along the array and contacts only a bottom surface of each of the battery cells to transfer heat between the array and fluid.

2. The assembly of claim 1, wherein the flexible bladder is of a material with dielectric characteristics such that contents of the bladder are electrically insulated from the battery cells.

3. The assembly of claim 1, further comprising a heat generating module packaged within a vicinity of the thermal plate, wherein a portion of the flexible bladder extends outside a footprint of the battery cell array and proximate to the heat generating module.

4. The assembly of claim 1, further comprising a frame sized to receive the flexible bladder and configured to support the flexible bladder.

5. The assembly of claim 1, further comprising an inlet port in fluid communication with the flexible bladder and a pump, and configured to deliver fluid to the flexible bladder at a pump output rate.

6. The assembly of claim 5, further comprising a constrictor arranged between the inlet port and the flexible bladder, and configured to adjust a volumetric fluid flow rate of the fluid entering the flexible bladder.

7. A vehicle comprising:
   an array of battery cells defining surfaces including a bottom surface;
   a support structure configured to support the array thereupon and such that the array and support structure define a cavity therebetween; and
   a thermal plate configured for thermal communication with the array, extending throughout the cavity and along the bottom surface of the array, and including a flexible bladder configured to adjust between a first and second volume and defining a bladder surface configured to substantially conform to only the bottom surface of the array when the flexible bladder has the first or second volume.

8. The vehicle of claim 7, further comprising an inlet port in fluid communication with the flexible bladder and a pump configured to direct fluid flow thereto such that the flexible bladder expands or contracts between the first and second volumes.

9. The vehicle of claim 7, further comprising a heat generating module packaged within a vicinity of the thermal plate, wherein a portion of the flexible bladder extends outside a footprint of the battery cell array and proximate to the heat generating module.

10. The vehicle of claim 7, wherein the flexible bladder further includes ribs defining channels therebetween and wherein the channels are configured to direct fluid flow along the at least one surface.

11. The vehicle of claim 10, wherein the ribs define the support structure such that the ribs receive a load of the array.

12. A traction battery assembly comprising:
   a battery cell array defining surfaces including a bottom surface;
   a support structure configured to support the array such that the array and support structure define a cavity therebetween;
   a thermal plate including a frame having ribs defining channels therebetween and configured to direct thermal fluid flow therein, and a flexible bladder extending along the bottom surface of the battery cell array and secured between portions of the frame and above the ribs defining a bladder cavity therebetween; and
   an inlet port configured to deliver thermal fluid to the bladder cavity,
   wherein the flexible bladder is configured to expand in response to an increase in a pressure of the thermal fluid flow such that a surface of the flexible bladder contacts only the bottom surface of the array.

13. The assembly of claim 12, further comprising another inlet port located on an end portion of the thermal plate opposite the other inlet port and configured to deliver thermal fluid to the bladder cavity, wherein the inlet ports are arranged to deliver fluid to separate channels in different flow directions relative to one another.

14. The assembly of claim 12, wherein the flexible bladder is made of a material having dielectric properties.

15. The assembly of claim 12, further comprising a heat generating module packaged within a vicinity of the thermal plate, wherein a portion of the flexible bladder extends outside a footprint of the battery cell array and proximate to the heat generating module.

16. The assembly of claim 12, further comprising a constrictor arranged between the inlet port and the bladder cavity which is configured to adjust a volumetric fluid flow rate of the fluid entering the bladder cavity.

17. The assembly of claim 12, wherein the thermal plate at least partially supports the array.

* * * * *